(12) United States Patent
Horiguchi et al.

(10) Patent No.: US 11,541,897 B2
(45) Date of Patent: Jan. 3, 2023

(54) AUTONOMOUS DRIVING CONTROL DEVICE

(71) Applicant: Hitachi Automotive Systems, Ltd., Hitachinaka (JP)

(72) Inventors: Tatsuya Horiguchi, Tokyo (JP); Teppei Hirotsu, Tokyo (JP); Hideyuki Sakamoto, Hitachinaka (JP); Ryohichi Inada, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 214 days.

(21) Appl. No.: 16/488,896

(22) PCT Filed: Mar. 15, 2018

(86) PCT No.: PCT/JP2018/010155
§ 371 (c)(1),
(2) Date: Aug. 26, 2019

(87) PCT Pub. No.: WO2018/173909
PCT Pub. Date: Sep. 27, 2018

(65) Prior Publication Data
US 2020/0023854 A1 Jan. 23, 2020

(30) Foreign Application Priority Data

Mar. 24, 2017 (JP) .............................. JP2017-058391

(51) Int. Cl.
*B60W 50/00* (2006.01)
*G05D 1/00* (2006.01)
(Continued)

(52) U.S. Cl.
CPC ............ *B60W 50/00* (2013.01); *B60W 10/18* (2013.01); *B60W 10/20* (2013.01); *B60W 30/18* (2013.01);
(Continued)

(58) Field of Classification Search
CPC ...... B60W 50/00; B60W 10/18; B60W 10/20; B60W 30/18; B60W 2710/18; B60W 2710/20; G05D 1/0088
See application file for complete search history.

(56) References Cited

U.S. PATENT DOCUMENTS 9,195,232 B1 * 11/2015 Egnor .................. B60W 10/20
2002/0032514 A1 3/2002 Kuroda
(Continued)

FOREIGN PATENT DOCUMENTS

JP 2004-359121 A 12/2004
JP 2007-168788 A 7/2007
(Continued)

OTHER PUBLICATIONS

International Search Report with English translation and Written Opinion issued in corresponding application No. PCT/JP2018/010155 dated Jul. 10, 2018.

*Primary Examiner* — Nicholas Kiswanto
*Assistant Examiner* — Jamal A Shah
(74) *Attorney, Agent, or Firm* — Foley & Lardner LLP

(57) ABSTRACT

An object of the present invention is to enhance the reliability of an autonomous driving system. The autonomous driving system includes: a higher-level control device 1 that outputs a control target value of an actuator group based on an action plan of a vehicle; and a lower-level control device 2 that controls the actuator group of the vehicle based on a command from the higher-level control device 1. The lower-level control device 2 holds the control target value of the vehicle provided by the higher-level control device 1 over a specific period. When the higher-level control device 1 does not satisfy a desired function, the lower-level control device 2 is configured to be controlled based on the held control target value. The action plan is followed by determining and correcting a difference between an actual action value and the control target value of the vehicle.

2 Claims, 8 Drawing Sheets

(51) Int. Cl.
*B60W 30/18* (2012.01)
*B60W 10/18* (2012.01)
*B60W 10/20* (2006.01)

(52) U.S. Cl.
CPC ....... *G05D 1/0088* (2013.01); *B60W 2710/18* (2013.01); *B60W 2710/20* (2013.01)

(56) References Cited

U.S. PATENT DOCUMENTS

| | | | |
|---|---|---|---|
| 2003/0169003 A1* | 9/2003 | Cao | B62D 6/008 318/432 |
| 2007/0156310 A1* | 7/2007 | Hirano | B60T 8/885 701/31.8 |
| 2011/0196579 A1 | 8/2011 | Tokimasa | |
| 2015/0100207 A1 | 4/2015 | Yoshimura | |
| 2017/0153644 A1 | 6/2017 | Otsuka | |
| 2017/0212513 A1 | 7/2017 | Iida | |
| 2017/0267221 A1* | 9/2017 | Hecker | B60T 13/683 |
| 2018/0170374 A1 | 6/2018 | Otsuka | |

FOREIGN PATENT DOCUMENTS

| | | |
|---|---|---|
| JP | 2007-253746 A | 10/2007 |
| JP | 2009-012672 A | 1/2009 |
| JP | 2011-162004 A | 8/2011 |
| JP | 2016-037149 A | 3/2016 |
| JP | 2016-038689 A | 3/2016 |
| JP | 2016-196295 A | 11/2016 |
| WO | WO-2017/038289 A1 | 3/2017 |

\* cited by examiner

FIG. 2

| TIME | STEERING ANGLE | VELOCITY |
|---|---|---|
| 0 | $\theta_0$ | $V_0$ |
| 0.1 | $\theta_1$ | $V_1$ |
| 0.2 | $\theta_2$ | $V_2$ |
| 0.3 | $\theta_3$ | $V_3$ |
| 0.4 | $\theta_4$ | $V_4$ |
| ... | | |
| 9.9 | $\theta_{99}$ | $V_{99}$ |

FIG. 4

| TIME | STEERING ANGLE | VELOCITY |
|---|---|---|
| 0 | 5.0 | 10.0 |
| 0.1 | 4.9 | 9.9 |
| 0.2 | 4.8 | 9.8 |
| 0.3 | 4.7 | 9.7 |
| 0.4 | 4.6 | 9.6 |
| ... | | |
| 9.9 | 0 | 5.0 |

FIG. 6

| TIME | STEERING ANGLE | VELOCITY |
|---|---|---|
| 0 | 5.0 | 10.0 |
| 0.1 | 4.9 | 9.9 |
| 0.2 | 4.8 | 9.3 |
| 0.3 | 4.7 | 9.3 |
| 0.4 | 4.6 | 9.3 |
| .. | | |
| 9.9 | 0 | 5.0 |

| TIME | STEERING ANGLE | VELOCITY |
|---|---|---|
| 0 | 5.0 | 10.0 |
| 0.1 | 4.9 | 9.9 |
| 0.2 | 4.8 | 9.6 |
| 0.3 | 4.65 | 9.6 |
| 0.4 | 4.55 | 9.6 |
| ... | | |
| 9.9 | 0 | 5.0 |

AUTONOMOUS DRIVING CONTROL DEVICE

TECHNICAL FIELD

The present invention relates to an autonomous driving control device.

BACKGROUND ART

For achievement of an advanced autonomous driving system, a higher-level control device (electronic control device) that controls the autonomous driving is required to continue the operation for a specific period until passing the operation to the driver even if a failure occurs in the device itself, for example.

In order to realize the continuance of operation for a predetermined period, redundancy using system multiplexing and operation monitoring can be considered.

On the other hand, generally, a higher-level control device has a high calculation load.

To address this issue, PTL 1 suggests a method for continuing control over a plurality of multiplexed actuator driving devices (lower-level control device group) for a specific period by accumulating control command values in advance in a higher-level control device (electronic control device) without providing the electronic control device with redundancy.

CITATION LIST

Patent Literature

PTL 1: JP 2016-38689 A

SUMMARY OF INVENTION

On the other hand, in a situation where the higher-level control device does not fulfill its function, it becomes difficult to realize the coordinated operation of the lower-level control device group.

Since the lower-level control device group continues control based on the control command values independently held by itself, control error is accumulated in each control system. This may lead to an action diverged from a running mode determined in advance by the higher-level control device.

The present invention has been made in view of the above-described points, and an object thereof is to enhance the reliability of an autonomous driving system.

Solution to Problem

In order to solve the above problems, the present invention includes, as an example: a higher-level control device that outputs a control target value of an actuator group based on an action plan of a vehicle; and a lower-level control device that controls the actuator group of the vehicle based on a command from the higher-level control device. The lower-level control device holds the control target value of the vehicle provided by the higher-level control device over a specific period. When the higher-level control device does not satisfy a desired function, the lower-level control device is configured to be controlled based on the held control target value. The action plan is followed by determining and correcting a difference between an actual action value and the control target value of the vehicle.

Advantageous Effects of Invention

According to the present invention, it is possible to enhance the reliability of the autonomous driving system.

BRIEF DESCRIPTION OF DRAWINGS

FIG. 2 is an example of output data from a trajectory planning device in the example of the present invention.

FIG. 4 is a diagram illustrating steering angle values and velocity values corresponding to the intended own vehicle trajectory in the example of the present invention.

FIG. 6 is a diagram illustrating steering angle values and velocity values corresponding to the actual running trajectory in the example of the present invention.

DESCRIPTION OF EMBODIMENTS

Hereinafter, an autonomous driving control device according to an example of the present invention will be described with reference to the drawings. In the present example, when outputting the results of calculation based on input signals from various sensors mounted on a control target to an electronic control device, the appropriate calculation results can be output.

Figure 1:
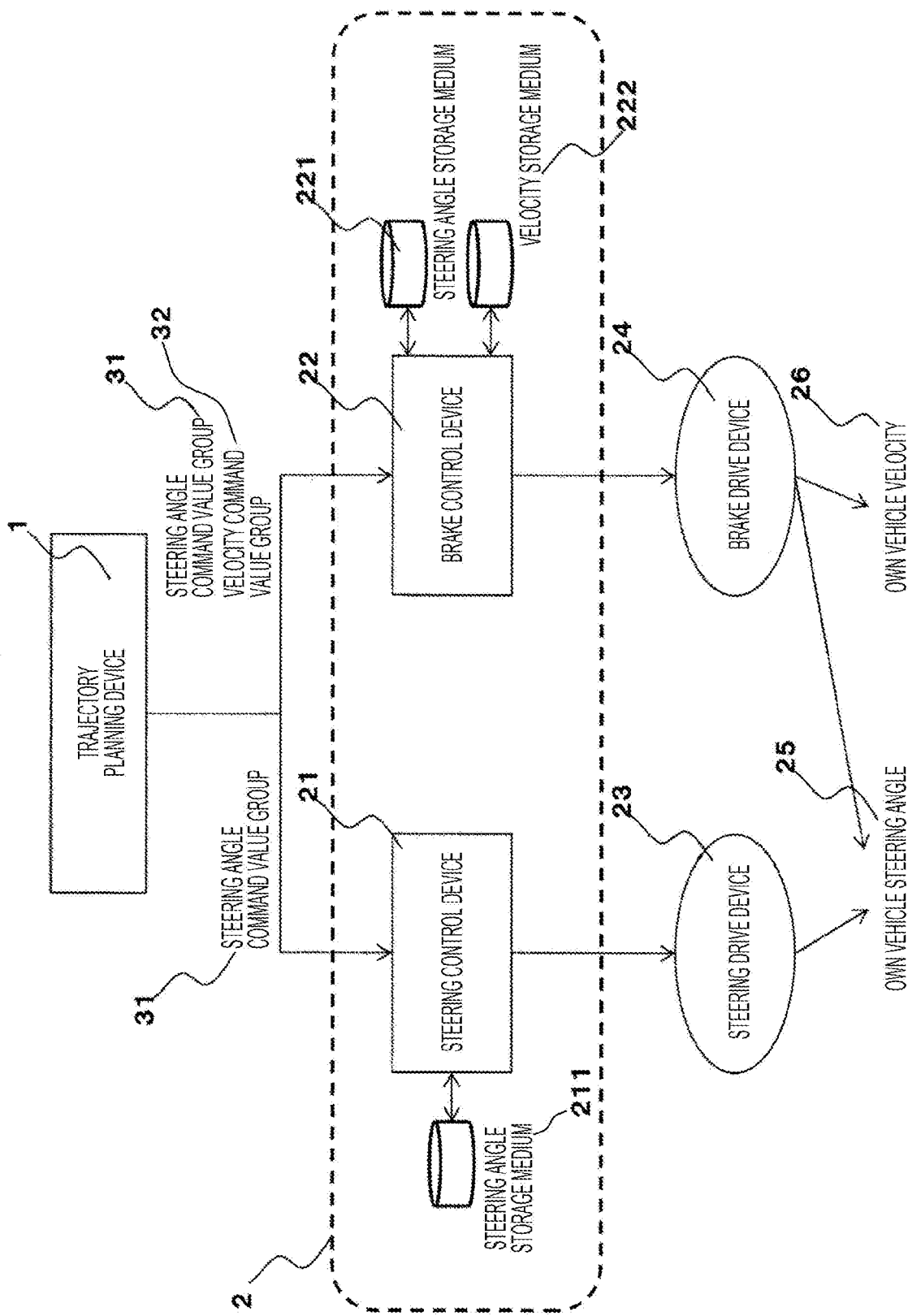
FIG. 1 is a block diagram illustrating a configuration of an autonomous driving system according to an example of the present invention.

FIG. 1 illustrates an overall configuration of an autonomous driving system in the present example. This system includes a trajectory planning device 1 as a higher-level control device that, upon receipt of inputs of own vehicle state amount observation values from an external information observation device such as a sensor not illustrated and an own vehicle state amount observation device mounted in an own vehicle, converts an own vehicle running trajectory including a velocity command value, a steering angle command value, and others of the own vehicle to a steering angle and a velocity and outputs the same.

This system also includes a lower-level control device 2 that has a steering control device 21 driving an actuator based on the velocity command value, the steering command value, and others output from the trajectory planning device 1, a brake control device 22, and a power train control device and a suspension control device not illustrated.

In relation to the present example, for the sake of simplification, coordinated operations by the two control devices, that is, the steering control device 21 and the brake control device 22 will be described. However, the present example is not limited to this but can be applied to coordinated operations by two or more control devices.

The lower-level control device 2 receives a predetermined command value data group 3 that includes command values of steering angle and velocity for a specific period to come as illustrated in FIG. 2, which is generated by the trajectory planning device 1 as a higher-level control device. The lower-level control device 2 saves the command value data group 3 in a storage medium that is formed from a random access memory (RAM) or the like configured in the lower-level control device group 2. In the present example, the system is based on the assumption that the trajectory planning device 1 outputs steering angle and velocity command values for 10 seconds to come at intervals of 100 milliseconds. Further, FIG. 2 illustrates an example in which the command value data group 3 is created with time information. However, the command value data group 3 that has no time information and is sorted and output in chronological order can be processed in the same manner as described below.

The command value data group is updated in each period of operation of the trajectory planning device 1. In the present example, a steering angle command value data group 31 is held in a steering angle storage medium 211 that is formed inside or outside the steering control device 21, and the steering angle command value data group and a velocity command value data group 32 are respectively held in a steering angle storage medium 221 and a velocity storage medium 222 that are formed inside or outside the brake control device 22.

When the trajectory planning device 1 satisfies the required trajectory generation function, the steering control device 21 and the brake control device 22 control steering and braking of the own vehicle by using control command values to be output out of the steering angle command value group 31 and the velocity command value group transmitted from the trajectory planning device 1 in each specific period.

On the other hand, when the trajectory planning device 1 cannot satisfy the required trajectory generation function due to a failure of internal calculation, for example, the steering control device 21 is driven according to the steering angle command value group 31 held in the steering angle storage medium 211, and the brake control device 22 is driven according to the velocity command value group 32 held in the velocity storage medium 222, thereby to continue steering and braking of the own vehicle. Accordingly, even when the trajectory planning device 1 does not satisfy the desired function, using the steering angle command value group 31 and the velocity command value group 32 generated in advance by the trajectory planning device 1 and held in the steering angle storage medium 211 and the velocity storage medium 222 makes it possible to continue autonomous driving for a specific period of time although the control function is degenerated.

In the autonomous driving system configuration that performs such control, as long as the trajectory planning device 1 is operating properly, the steering angle of the own vehicle controlled by the steering control device 21 and the velocity of the own vehicle controlled by the brake control device 22 can be coordinated by the trajectory planning device 1. On the other hand, when the trajectory planning device 1 does not satisfy the desired function, the steering angle and the velocity of the own vehicle are independently controlled according to the steering angle command value group 31 and the velocity command value group 32 respectively held by the steering control device 21 and the brake control device 22, which makes it difficult to implement coordinated operation. The steering angle and velocity are subject to the influences of control errors, road gradients that are difficult to determine in advance by the trajectory planning device 1, road surface conditions, and others. This causes divergence from an intended own vehicle trajectory 4 as an own vehicle trajectory generated in advance by the trajectory planning device 1. In order to correct such divergence, in the present example, the right and left velocities are independently controlled by the brake control device 22 and corrections are added to the control of the own vehicle steering angle performed by the steering control device 21, thereby to implement coordinated operation even in the absence of the trajectory planning device 1 as a higher-level control device. Hereinafter, an outline of error determination from a trajectory planned in advance by the trajectory planning device 1 and correction of the error will be described.

Figure 3:
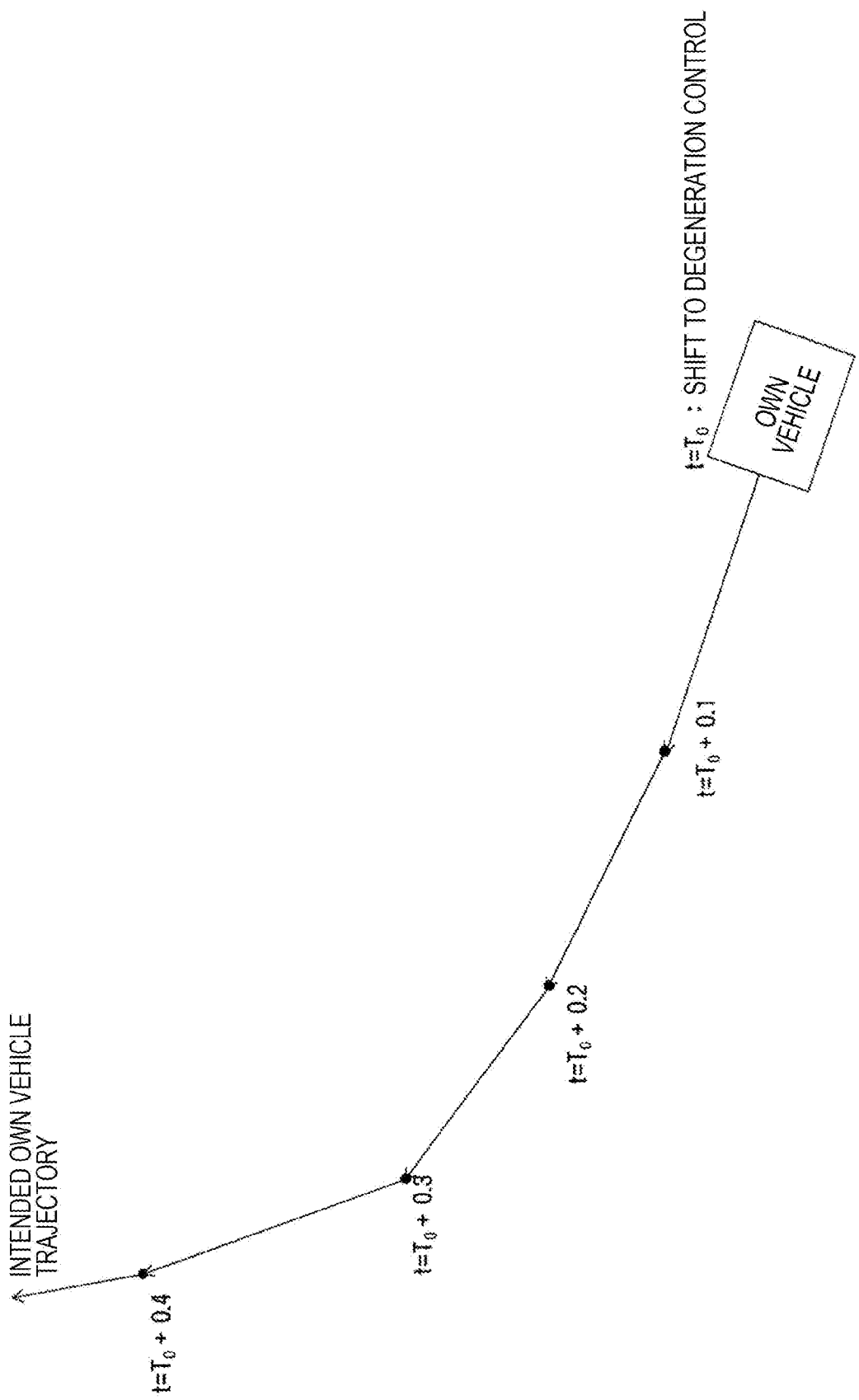
FIG. 3 is a diagram illustrating an intended own vehicle trajectory according to the example of the present invention.

An example of a situation in which to perform a correction operation will be described below. It is assumed that now the trajectory planning device 1 comes not to satisfy a desired function at time T0 while the own vehicle is running along a curved trajectory. At this time, the previous operation result of the trajectory planning device 1 indicates that the steering angle command value data group 31 and the velocity command value data group 32 held in the steering angle storage medium 211 and the velocity storage medium 222 corresponding to the intended own vehicle trajectory 4 illustrated in FIG. 3 have been output, and degeneration control is started according to this. FIG. 4 illustrates an example of the steering angle command value data group 31 and the velocity command value data group 32 at this time.

Figure 5:
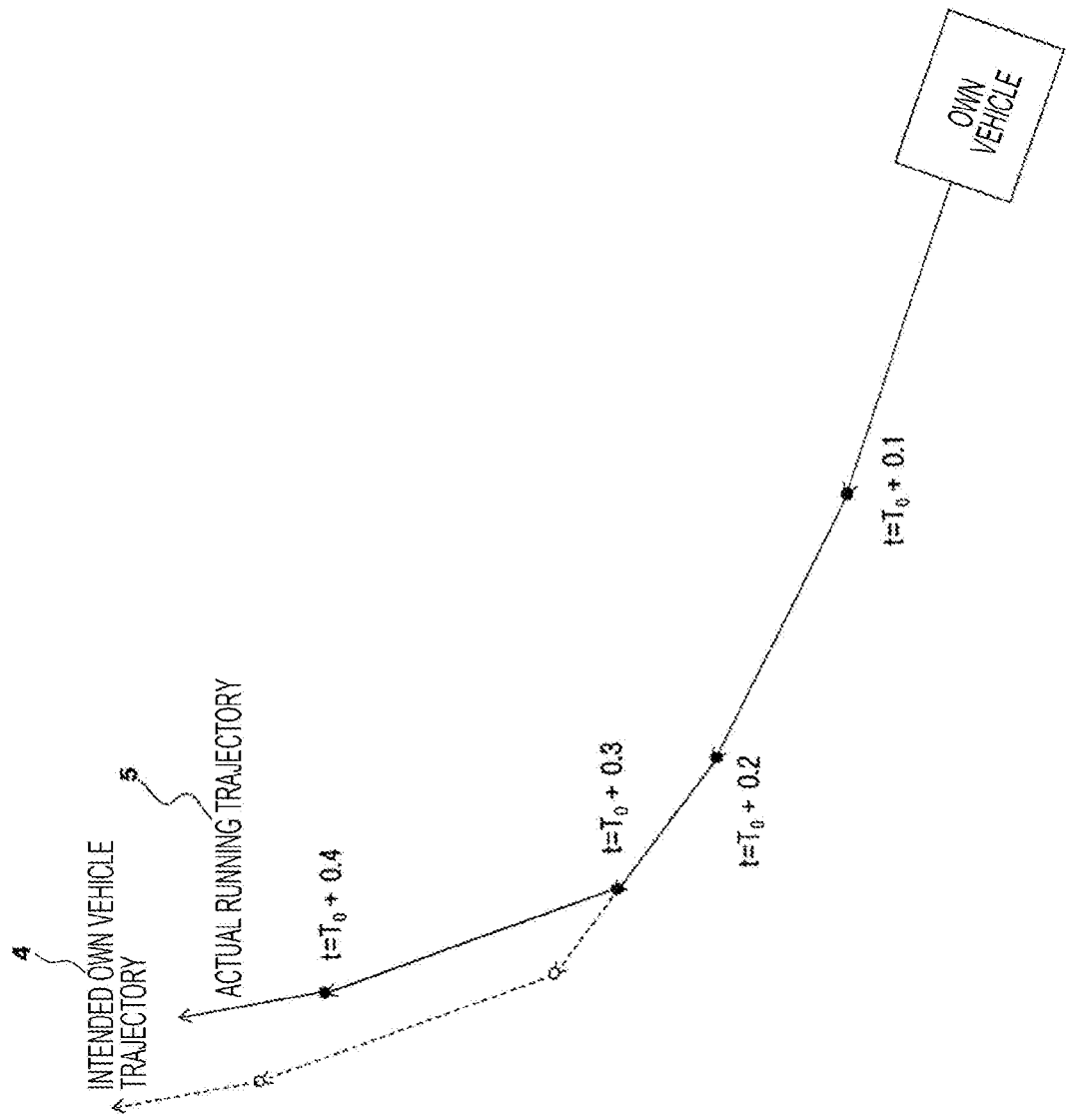
FIG. 5 is a diagram illustrating a divergence between the intended own vehicle trajectory and an actual running trajectory in the example of the present invention.

As described above, the command value groups illustrated in Table 2 are not necessarily followed due to environmental influences such as errors in the control system, road gradients, and road surface friction. FIGS. 5 and 6 illustrate the running state without correction operation. It is assumed that the velocity at time 0.2 described in Table 3 has changed from the state of FIG. 4 that illustrates the predetermined command value group. At this time, due to the change in velocity at time 0.2 described in FIG. 6, feedback is applied to the velocity controlled by the brake control device 22 from time 0.3 onward, and the velocity from time 0.3 onward is adjusted as illustrated in FIG. 6. However, since the steering control device 21 performs control independently of the brake control device 22 and its control system, an actual running trajectory 5 diverged from the intended own vehicle trajectory 4 set by the trajectory planning device 1 is taken so that it can be understood as being difficult to follow the original intended own vehicle trajectory 4.

Figure 7:
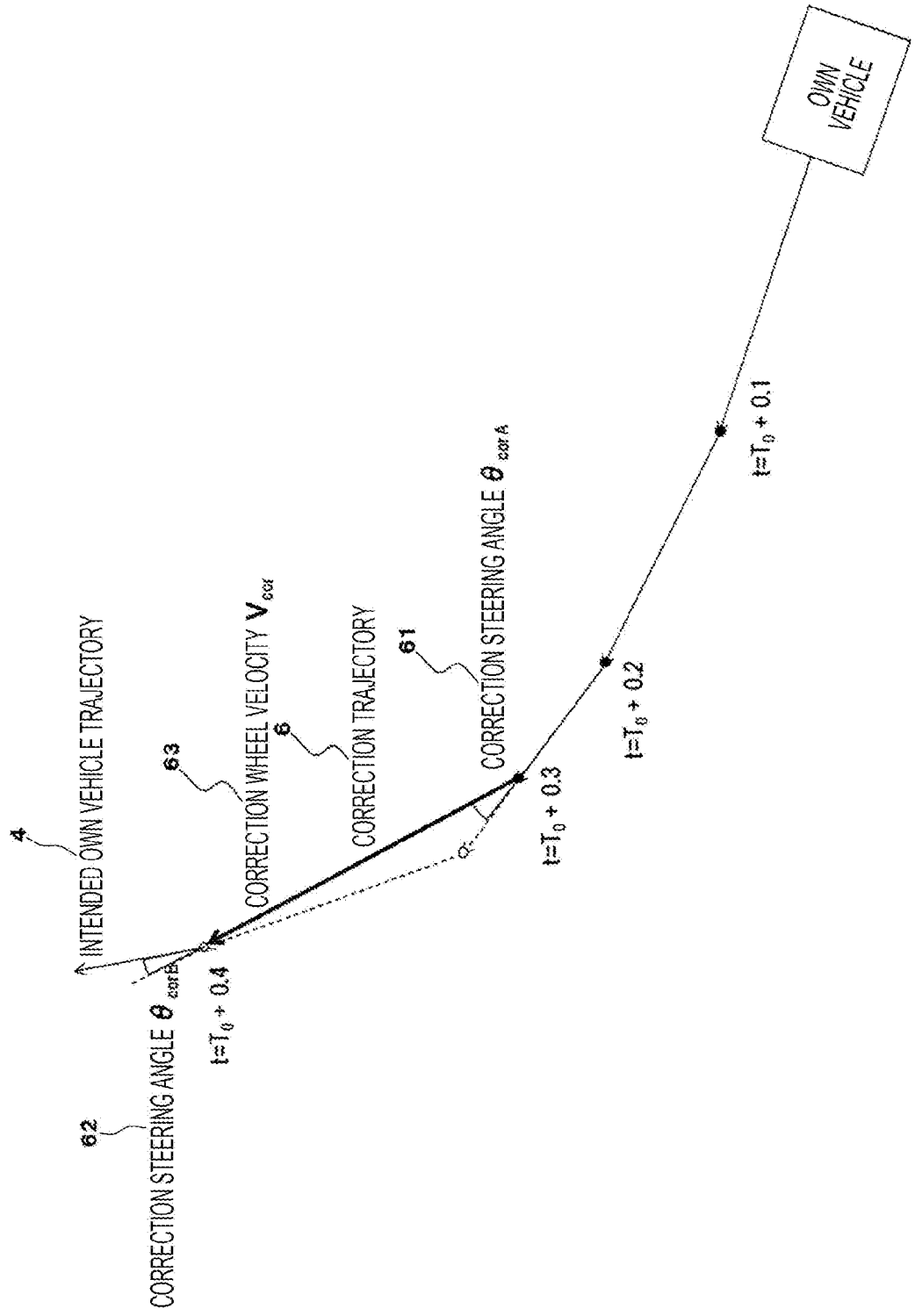
FIG. 7 is a diagram illustrating a correction trajectory in the example of the present invention.
Figures 8, 9:
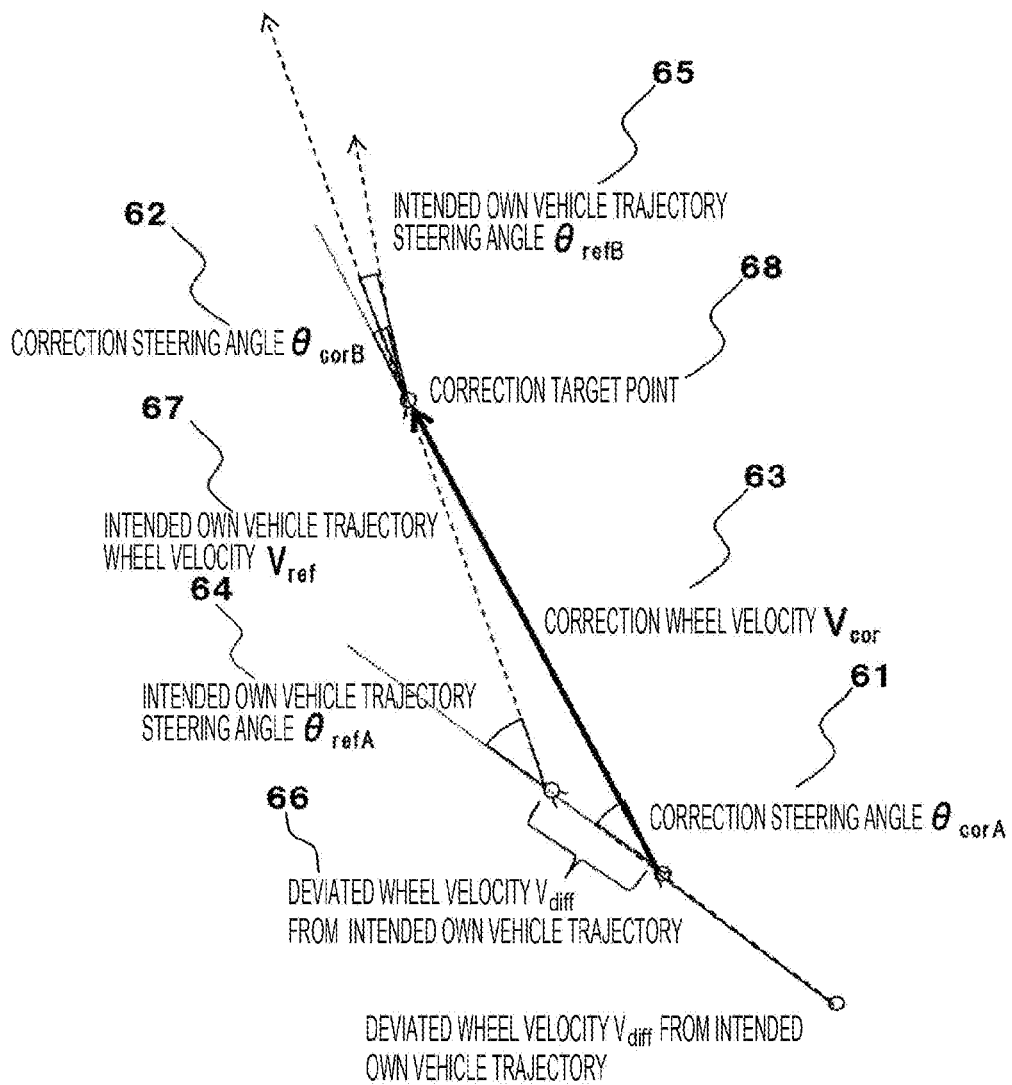
FIG. 8 is a diagram illustrating steering angle values and velocity values corresponding to the correction trajectory in the example of the present invention.
FIG. 9 is a diagram illustrating a method for calculating the steering angle values and the velocity values corresponding to the correction trajectory in the example of the present invention.

Therefore, as described above, the right and left velocities are independently controlled by velocity control to make a change to steering and the correction of the command values corresponding to a correction trajectory 6 illustrated in FIG. 7 is performed as illustrated in FIG. 8, thereby to implement re-follow the initially set own vehicle trajectory. As an example, the correction trajectory 6 can be formed from a correction steering angles $\theta\_corA$ 61 and $\theta\_corB$ 62, and a correction velocity $V\_cor$ 63. The correction steering angles $\theta\_corA$ 61 and $\theta\_corB$ 62, and the correction velocity $V\_cor$ 63 are given by, for example, the following correction method 1. An intended own vehicle trajectory steering angle $\theta\_ref$ 64 illustrated in FIG. 9 has a steering angle command value prescribed in advance by the trajectory planning device 1 at a control time immediately after the occurrence of a divergence from the intended own vehicle trajectory 4, and a diverged velocity $V\_diff$ 65 from the intended own vehicle trajectory has an error value between the intended own vehicle trajectory 4 and the actual own vehicle velocity due to environmental influences such as error in the control system, road gradients, and road surface friction.

Correction Method

Based on the positional relationship (distance) between a correction target point 68 and a correction start position, V_cor 63 is determined.

By determining V_cor63, θ_corA61 and θ_corB62 can be obtained by the following Equations 1 and 2:

$$\theta\_corA = \arcsin(Vref * \sin \theta\_refA / V\_cor) \quad \text{[Equation 1]}$$

$$\theta\_corB = \theta\_refB - \theta\_refA + \theta\_corA \quad \text{[Equation 2]}$$

According to the above method, it is possible to create the correction trajectory 6 for correcting the actual trajectory to the intended own vehicle trajectory 4.

The correction steering angles θ_corA 61 and θ_corB 62 can be generated at the own vehicle velocity kept at the correction velocity V_cor 63 by the brake control device 22 individually controlling the right and left velocities.

In the present example, the own vehicle is diverged from the intended own vehicle trajectory 4 at time T0+0.3 and is returned to the intended own vehicle trajectory 4 at time T0+0.4, that is, in 100 msec as one control cycle of the autonomous driving control device. In the present example, however, only the steering control device 21 and the brake control device 22 are operated in cooperation, and no power train control device or the like is used. This may make it difficult to increase the velocity. In such a case, for example, it is necessary to continue the correction for a time corresponding to a plurality of control cycles to reduce the divergence from the intended own vehicle trajectory 4 along the time axis. The same applies to a case where the own vehicle is supposed not to return in one control cycle from the viewpoint of the passenger's comfort and the like.

Further, the present example has been described based on the assumption that the divergence from the intended own vehicle trajectory 4 is caused by a difference between the velocity command value data group 32 held by the brake control device 22 and the actual velocity value measured by the velocity sensor. However, the divergence may be caused by a difference between the steering angle command value data group 31 held by the steering control device 21 and the steering angle actual measurement value measured by the steering angle sensor, or by simultaneous differences in the steering angle and the velocity. In the case where there occurs a difference between the steering angle command value data group 31 and the steering angle actual measurement value, the difference from the steering angle command value data group 31 held in the steering angle storage medium 221 in the brake control device 22 is detected by a velocity sensor mounted on the brake control device 22 system or a yaw moment sensor mounted on the vehicle body, so that the own vehicle can follow the intended own vehicle trajectory 4 by the same means as described above.

The above example includes: a higher-level control device that outputs a control target value of an actuator group based on an action plan of a vehicle; and a lower-level control device that controls the actuator group of the vehicle based on a command from the higher-level control device. The lower-level control device holds the control target value of the vehicle provided by the higher-level control device over a specific period. When the higher-level control device does not satisfy a desired function, the lower-level control device is configured to be controlled based on the held control target value. The action plan is followed by determining and correcting a difference between an actual action value and the control target value of the vehicle.

In addition, a plurality of the lower-level control devices is provided. One of the lower-level control devices monitors the other lower-level control device. When detecting a deviation of the vehicle from the action plan, the one lower-level control device corrects the control target value of the other lower-level control device.

In addition, when a brake controller as one of the lower-level control devices monitors the behavior of a steering controller as the other lower-level control device. When detecting a deviation of the vehicle from the action plan, the brake controller corrects the control target value of the steering controller by controlling the right and left velocities.

According to the example described above, even when the trajectory planning device 1 does not satisfy the desired function, the coordinated operations of the steering control device 21 and the brake control device 22 can be implemented, so that the vehicle can continuously follow the intended own vehicle trajectory 4 preset by the trajectory planning device 1. This makes it possible to eliminate redundancy of the trajectory planning device 1 without losing the reliability of the autonomous driving system, thereby achieving the autonomous driving system at low cost.

In the present example, an advanced autonomous driving system can be achieved at low cost. In addition, in the concept of accumulating command values in the lower-level control device group, implementing the coordinated operations of the lower-level systems makes it possible to achieve an advanced autonomous driving system at low cost and with high reliability.

In the present example, the cooperative operations can be implemented only by the accumulated control command values held between the lower-level controllers without the intervention of the higher-level controller. As a result, it is possible to realize the command value-accumulated safety concept for functional safety, eliminate multiplexing of the higher-level electronic control device without degrading the reliability of implementation of the advanced autonomous driving system, and achieve the system at low cost.

The embodiments and various modifications described above are merely examples, and the present invention is not limited to these contents as long as the features of the invention are not impaired.

REFERENCE SIGNS LIST

1 Trajectory planning device (higher-level control device)
2 Lower-level control device
21 Steering control device
22 Brake control device
23 Steering drive device
24 Brake drive device

The invention claimed is:
1. An autonomous driving controller comprising:
 a higher-level controller configured to output a control target value of an actuator group based on an action plan of a vehicle; and
 a lower-level controller configured to control the actuator group of the vehicle based on a command from the higher-level controller, wherein the lower-level controller is configured to hold the control target value of the vehicle provided by the higher-level controller over a specific period, the lower-level controller is configured to be controlled based on the held control target value when the higher-level controller does not satisfy a desired function, and wherein the action plan is followed by determining and correcting a difference between an actual action value and the control target value of the vehicle, wherein a plurality of lower-level controllers is provided, one of the lower-level controllers is configured to monitor another lower-level controller, and each lower-level controller configured to control a respectively independent actuator group of the vehicle based on a respectively independent target value, and responsive to detecting a deviation of the vehicle from the action plan, the one lower-level controller corrects the control target value of the another lower-level controller, wherein when a brake controller as the one lower-level controller monitors behavior of a steering controller as the other lower-level controller, and when detecting a deviation of the vehicle from the action plan, the brake controller is configured to correct the control target value of the steering controller by controlling braking to control right and left velocities, wherein the steering controller and the brake controller are configured to respectively control a steering angle and a velocity of an own vehicle independently according to a steering angle command value group and a velocity command value group respectively held by the steering controller and the brake controller, and wherein when the higher-level controller does not satisfy a desired function, at least one of the lower-level controllers is configured to be controlled based on a control target value held by the least one of the lower-level controllers.

2. The autonomous driving controller of claim 1, wherein:

the braking controller is configured to control the right and left velocities independently and the steering controller is configured to correct the steering angle so as to provide a coordinated operation even in the absence of the higher level controller.

* * * * *